Nov. 24, 1964 J. L. MASURE 3,158,689

SYSTEM FOR DETERMINING AND SELECTING FREE ALIGNED TELECOMMUNICATION CHANNELS

Filed Sept. 13, 1960 4 Sheets-Sheet 1

Inventor
J. MASURE
By [signature]
Agent

Nov. 24, 1964 J. L. MASURE 3,158,689

SYSTEM FOR DETERMINING AND SELECTING FREE ALIGNED TELECOMMUNICATION CHANNELS

Filed Sept. 13, 1960 4 Sheets-Sheet 2

Inventor
J. MASURE
By [signature]
Agent

Nov. 24, 1964 J. L. MASURE 3,158,689

SYSTEM FOR DETERMINING AND SELECTING FREE ALIGNED TELECOMMUNICATION CHANNELS

Filed Sept. 13, 1960 4 Sheets-Sheet 3

Inventor
J. MASURE
By [signature]
Agent

Nov. 24, 1964 J. L. MASURE 3,158,689

SYSTEM FOR DETERMINING AND SELECTING FREE ALIGNED TELECOMMUNICATION CHANNELS

Filed Sept. 13, 1960 4 Sheets-Sheet 4

Inventor
J. MASURE
By Paul W. Hemminger
Agent 3,158,689
Patented Nov. 24, 1964

3,158,689

SYSTEM FOR DETERMINING AND SELECTING FREE ALIGNED TELECOMMUNICATION CHANNELS

Jean Louis Masure, Antwerp, Belgium, assignor to International Standard Electric Corporation, New York, N.Y., a corporation of Delaware Filed Sept. 13, 1960, Ser. No. 55,647
9 Claims. (Cl. 179—15)

The invention describes a system for determining and selecting free aligned telecommunication channels in time division multiplex interconnection network, e.g. an automatic telephone exchange, which network consists of a plurality of time division multiplex links or highways, each highway offering N time channels numbered 1 to N, and in which network a connection utilizing a single time slot, i.e. correspondingly numbered or "aligned" time channels, is made over at most R cascaded highways, said system comprising means for comparing the channel occupation on a set of R cascaded highways.

Such a system is known from Belgian Patent No. 515,605 (S. Van Mierlo-H. Adelaar). This patent describes the overall organization of a three-stage time division multiplex telephone exchange. The subscriber lines are grouped, each group of lines having access, by gating and modulating means, to a primary time division multiplex link or primary "highway," and to a secondary highway. Any connection in the exchange is made on a single time slot over a primary highway and a secondary highway, each primary highway having access to every secondary highway by means of interconnecting gates. At the initial establishment of a connection it is thus necessary to select a pair of aligned channels free on both the highways making up the connection. The channel selection system disclosed by this patent is constituted by a gating network controlled, on the one hand, by pulses issued from the speech gate controlling memory device associated to the primary highway, and occurring on time channels free on this highway, and, on the other hand, inhibited by pulses derived directly from the pulses appearing on the secondary highway and thus occurring on the busy channels on that highway. The first pulse appearing at the output of the gating network occurs on a channel free on both highways and is used to seize this channel for the new connection.

This mode of channel selection presents a number of inconvenients. It is practically restricted to a three-stage interconnection network: its extension to a four-stage network, in which it is required to select a channel free on three cascaded highways, will lead to an extremely and unnecessarily complex realization. The channel occupation of one of the highways as determined by directly tapping that highway disturbs the existent traffic. All the pulse trains utilized in the selection are channel pulses, short pulses of a duration of the order of the microsecond; the gating circuits and other attendant logical circuits must be designed for high speed logic.

An object of the invention is to elaborate a system for channel selection that presents a maximum degree of flexibility, so that it can equally well cope with a three-stage, four-stage or *n*-stage interconnection network, and whose operation is totally independent of the speech path multiplex network, so that it neither disturbs the transmission path nor depends on the channel pulses for its internal timing relations.

The invention is characterized in that to each highway is attributed one row of N memory cells numbered 1 to N, each cell corresponding to the same-numbered time channel on that highway and storing the free or busy condition of that channel, in that, according to the direct mode of operation in which one or more free time slots are to be selected on a set of P cascaded highways, P being inferior or equal to R, the P corresponding rows of memory cells are addressed by a register and read out, in that the channel occupation information thus made available is processed by a first set of N alignment coincidence gates numbered 1 to N, a signal appearing on each gate corresponding to a free P-channel time slot, in that a lock-out circuit is provided for the selection of one or more of said free time slots, in that the memory cells corresponding to the selected channels are busied, and in that, according to the complementary mode of operation in which one or more previously engaged time slots are to be recorded as liberated on a set of P cascaded highways, the P corresponding rows are addressed by the register, and the memory cells corresponding to the liberated channels are made free.

The channel selection system thus disclosed by the invention is under the exclusive control of the register, which performs the central logic operations of the exchange. Its operating cycle is necessarily related to that of the register, but in any arbitrary way so that the speed of channel selection can be adapted to the circuit requirements. In its memory assembly it provides a complete and always up to date record of the state of channel occupation on all the highways. It can intrinsically provide any arbitrary statistic relative to the connections effected in the exchange, and in particular it can determine the free aligned channels on any arbitrary set of highways.

The above mentioned and other objects and characteristics of the invention and the best manner of attaining them will be better understood from the following detailed description of embodiments to be read in conjunction with the accompanying drawings which represent:

Figure 1:
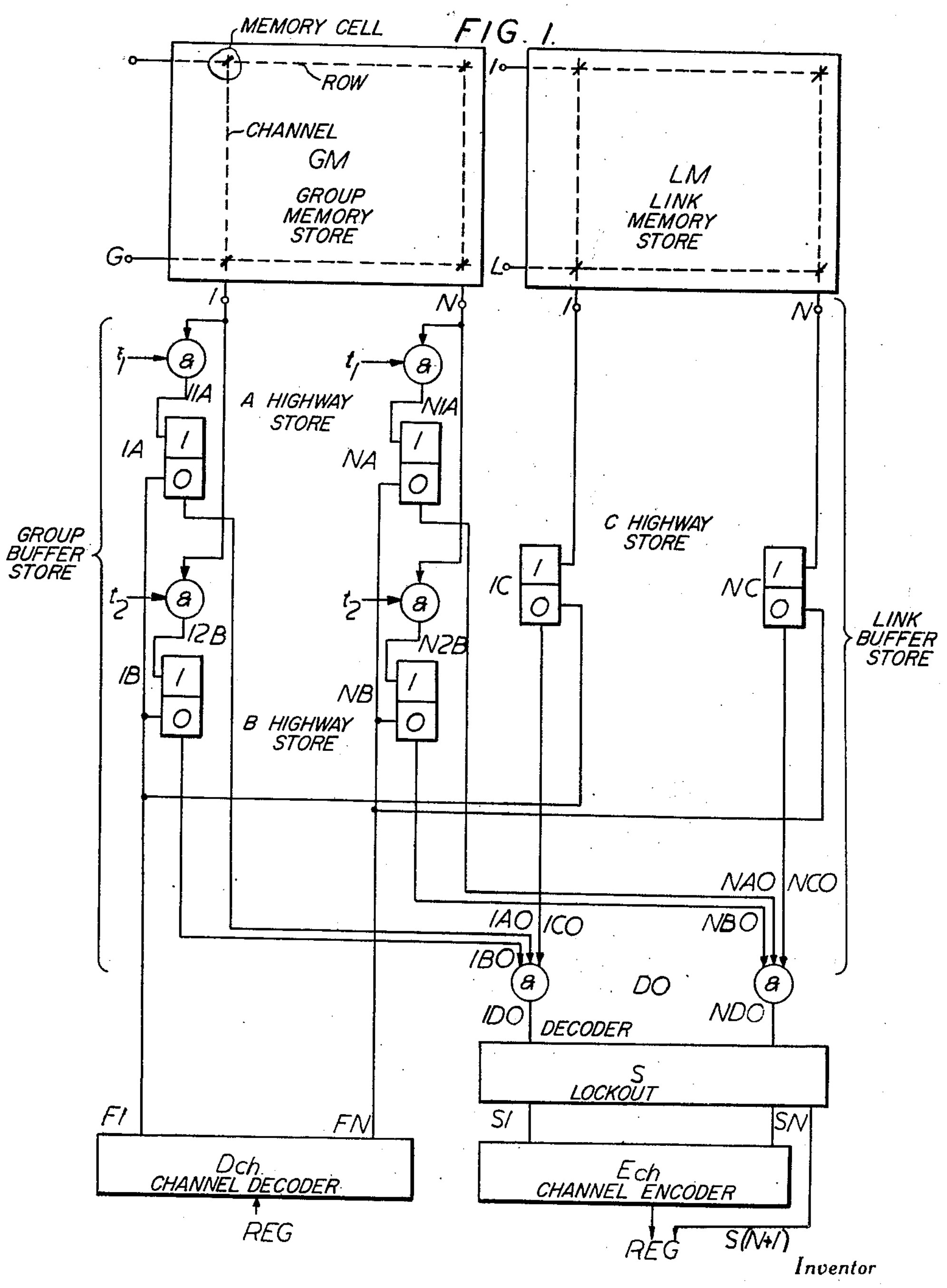
FIG. 1 is a schematic diagram of the invention.

The channel selection system hereafter called CHAST as disclosed by the invention forms part of the control system for a multistage time division multiplex interconnection network, such as is to be found in a time division multiplex telephone exchange, and in which a connection is made over a number of N-channel time division multiplex links or "highways" on corresponding or "aligned" channels. At the initial establishment of a connection it is necessary to determine and select an alignment of channels, or "time-slot," which is free and which thus may be utilized for the connection: this is the essential function of the CHAST.

The CHAST intervenes twice in the history of a connection. At its initiation it receives from a register with a selection order the identity of the highways required to make up the connection, and it selects a time slot free on this set of highways, the identity of which is returned to the register. When the connection is broken, the CHAST receives from the register with a liberation order the identities of the highways and of the time slot utilized, and records that the corresponding channels have been liberated on these highways.

The CHAST comprises three main parts: a memory, in which is stored the channel occupation state of each N-channel highway; a gating system comprising N coincidence gates hereafter called "alignment" gates which process the channel occupation information relative to any given set of highways to determine the time slots free on that set of highways; a lock-out network, to select one of these free time slots, which is attributed to the required connection.

The memory comprises a plurality of memory cells arranged in intersecting columns and rows, there being as many columns as channels and as many rows or addresses as there are highways in the exchange. Each row has N memory cells in which are registered the free or busy conditions of the N channels on the corresponding highway. On FIG. 1 the memory is divided into two units, G.M. and L.M. of G and L rows respectively, corresponding to the particular trunking arrangement of FIG. 2, which will be discussed below. The driving circuits associated to the memory units are not represented. The memory stores are addressed by the registor via decoding units not represented on FIG. 1.

To each memory store is associated at least one buffer store, such as A, B, C, (FIG. 1) comprising each N bistate devices such as IA, . . . , NA, corresponding to the N columns of the memory. The buffer stores allow for the convenient manipulation of the channel occupation information relative to any given set of highways: at the beginning of the CHAST cycle, a set of memory rows are read out and their information contents are transferred to the different buffer stores; at the end of the cycle, the information on the buffer stores has generally been modified and is transferred back into the set of memory rows. For the case in which two buffer stores such as A and B are associated to one memory store such as G.M. (FIG. 1), the information transfer to A and B is made on two time positions $t_1$ and $t_2$ respectively by means of coincidence gates 11A, . . . N1A, and 12B, . . . N2B respectively; the return transfer to G.M. also takes place on two time positions, by similar means not shown on FIG. 1.

When a free chanel alignment is to be selected for a new connection, the N alignment coincidence gates D0: ID0, . . . ND0, are rendered operative and process the information contained on the buffer stores such as A, B and C. According to FIG. 1, an alignment gate KD0 has three inputs KA0, KB0, KC0, coupled to the half element 0 of buffer store bistate devices KA, KB, KC. If these are all in the same condition characteristic of a free channel K, then a signal appears on the output of gate KD0.

In general, a certain number of alignment gates D0 will present an effective output, indicating a number of free time slots on the set of highways whose state of channel occupation is contained in the buffer stores. The lowest number free time slot is selected in the lock-out circuit S comprising N outputs: S1, . . ., SN. If K is the alignment selected, then a signal will appear on output lead SK of the lock-out circuit, none of the other leads being activated.

The identity of the time slot selected is encoded in the channel encoder $E_{ch}$ for transfer to the register.

The appearance of a signal on a lead SK also results in the immediate setting to the busy condition of the bistate devices KA, KB, KC.

The lock-out circuit is further provided with a supplementary output lead $S(N+1)$ which is activated only if no free alignment can be found. The register thus receives explicitly the information that no free time slot exists for the connection it wishes to establish.

When an established connection is broken, the CHAST memory must be brought up to date. As above, the channel occupation of the highways involved in the connection is displayed on the buffer stores A, B, C. The register further sends the identity of the channel utilized for the connection to the channel decoder $D_{ch}$ of FIG. 1. The N outputs F1, . . . FN, of the decoder are connected respectively to the bistates IA, IB, IC; . . .; NA, NB, NC, corresponding to the same channel. If channel K is the channel liberated, a signal will appear on FK to reverse the condition of the bistate devices KA, KB, and KC, which will be set to indicate that channel K is free. For this type of operation of the CHAST, the selection network is rendered inoperative.

The actual organization of the CHAST, with respect to the division of the memory into several units, and to the provision of a number of buffer stores to these units, depends entirely on the trunking scheme adopted for the exchange. The particular channel selection system represented by FIG. 1 is designed for the three-link interconnection network disclosed by our copending Dutch patent application of even date entitled "Interconnection network for a telecommunication system" (H. Adelaar). It is indispensable to outline the essential aspects of this trunking scheme in order to allow a full comprehension of the invention.

Figure 2:
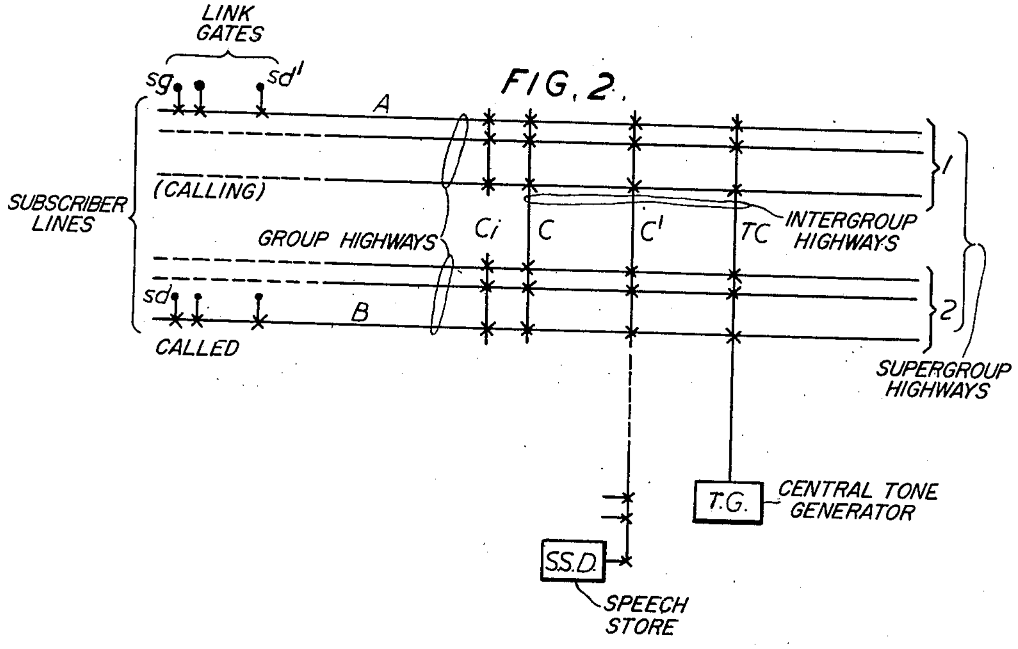
FIG. 2 is a fragment of the interconnection network of a particular telephone exchange.

FIG. 2 represents a fragment of the three-link trunking system and shows the different types of connections provided for. A group of subscriber lines, such as *sg*, . . . sd!, are connected to a time division multiplex link, or group highway, such as A, by means of line gates, represented as crosspoints, and modulating-demodulating means, not represented, individual to each line. The group highways are associated in sets or "supergroups." Two such supergroups 1 and 2 are shown on FIG. 2. They are interconnected by an inter-supergroup highway C, which has access to the group highways such as A and B by means of interconnecting gates represented as crosspoints. Intra-supergroup highways such as $C_1$ are provided for connections between group highways of the same supergroup.

For the general case in which the calling subscriber *sg* and the called subscriber *sd* belong to different groups, the connection is made over three multiplex links, A, C and B, on FIG. 2, and on a single time slot. If the two subscribers belong to the same supergroup, a link $C_1$ intervenes instead of a link C.

An entirely different type of connection is that between two subscribers *sg* and *sd'* belonging to the same group. These connections require the use of two time slots, and a speech storage device S.S.D. (FIG. 2) to allow for the change of channels. The group highways are connected to the S.S.D. by means of an intra-group link C'. As disclosed in Belgian Patent No. 558,906 (E. Wright-W. Bezdel), a speech storage device S.S.D. is constituted by a capacitor that is charged by the amplitude-modulated pulses on the first time channel, and discharged on the second channel. Functionally an intra-group connection is equivalent to two two-link connections: a first connection, on a single time slot, between the calling subscriber *sg* and an S.S.D. over highways A and C' (FIG. 2); and on these same highways a second connection, on a different time slot, between the called subscriber *sd'* and the S.S.D.

A third type of connection intervening in the exchange is that between a subscriber *sg* and a central tone generator T.G. (FIG. 2), the busy tone generator for instance. Each tone generator is controlled to all the group highways by means of a connecting link T.C., which is not a multiplex link, and by interconnecting gates. The connection between *sg* and a tone generator thus involves but a single highway, A.

The channel selection system for the interconnection network partially represented on FIG. 2 must thus be able to cope with the three cases of one, two, or three links being cascaded to make up a connection.

A number of different categories of highways appear in the fragmentary network of FIG. 2: group highways such as A and B, intermediate highways which can be either inter-supergroup highways such as C or intra-supergroup highways such as $C_1$, intra-group highways such as C'. For the complete network this list could be considerably lengthened.

The most convenient arrangement of the CHAST memory for this interconnection network has been found to be that of FIG. 1, in which two memory units G.M. and L.M. are provided. The memory store G.M. corresponds to the group highways, and has G rows corresponding to the G group highways in the network; all the other highways, which, in a general way, may be referred to as the "link highways," have their state of channel occupation recorded in the L rows of the L.M. memory store.

Any connection makes use of at most two group highways and one link highway. Thus, for channel selection, at most two rows of the store G.M. and one row of the store L.M. will have to be read out: to the store G.M. are therefore associated two buffer stores A and B, and to the store L.M., one buffer store C (FIG. 1).

The memory stores G.M. and L.M. are not detailed but can be designed according to any of a number of arrangements well known in the art. It will be supposed that the stores are square-loop magnetic core memories, the N columns of which correspond to the N channels of the time division multiplex system. According to whether a given channel on a given highway is busy or free the corresponding core is magnetized in its remanent state "1" or "0," state "1" being such that the core produces a signal on its column winding when subjected to a "read-out" pulse. This signal, after amplification in the column output amplifier, sets a bistate device of the buffer store in a characteristic condition: thus, by being read out, the information in the memory row is transferred on to the buffer store, where it is processed, and, generally, modified. Assuming that reading out of the memory is destructive, then in all cases the information on the buffer store must be re-inscribed into the memory row. The buffer store element controls a column writing amplifier, which, according to whether the information to be reinscribed in the memory core is a "1" or a "0" sends or does not send a half-write pulse on the column winding, the appropriate row winding being also energized by a half-write pulse.

It will now be proceeded with the detailed analysis of the CHAST logic. The operation of the CHAST, according to the design of FIG. 1, requires a time cycle of at least 6 time positions $t_1, \ldots, t_6$. This cycle is related in any arbitrary way to the time relations existing on the time division multiplex highways, but fits in with the register operating cycle.

CHAST operation will first be analyzed for the case of a 3-link channel selection. The CHAST cycle is initiated under the control of the register which issues a selection order SO (see below in connection with FIG. 3) to command a channel selection, and which presents the coded identities of two group highways A and B, and of the link highway C, respectively at the inputs of the access circuits of the memories G.M. and L.M. These access circuits are not represented on FIG. 1, and comprise decoding units, and drive pulse generating and distributing means under the control of the timing pulses. Coincident with the timing pulse $t_1$, a read pulse is connected to the memory row of G.M. (resp. L.M.) corresponding to highway A (resp. C). At the end of $t_1$, the channel occupation information relative to highways A and C has thus been transferred to the buffer stores A and C associated to memory stores G.M. and L.M. respectively. On time position $t_2$, the row corresponding to highway B is read out, and its information content is thus transfered to buffer store B at the end of $t_2$.

Figure 3:
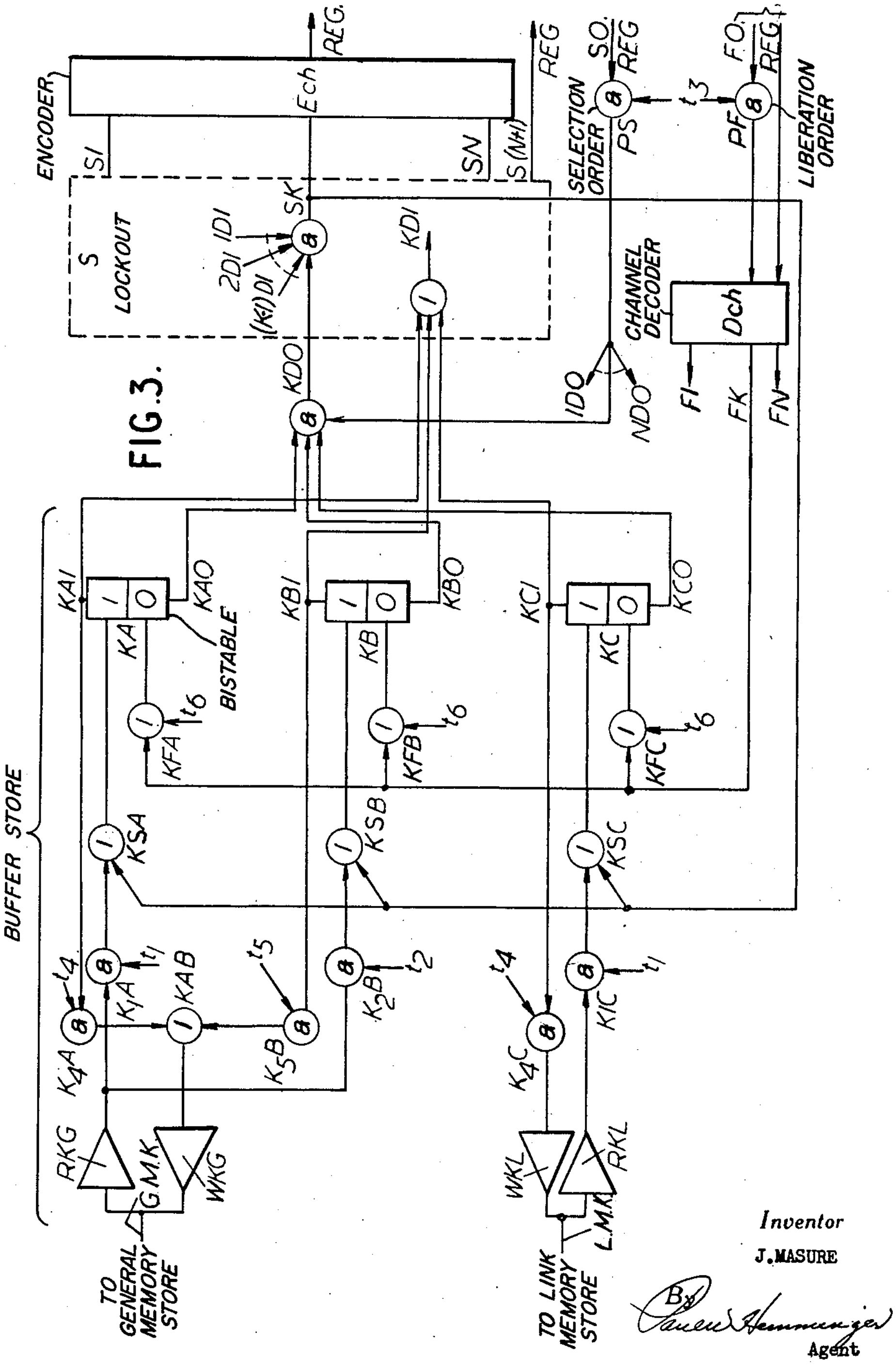
FIG. 3 is the detailed logical circuits relative to one channel.

The column circuits relative to a channel K are represented on FIG. 3. The output on column winding G.M.K. of memory G.M. is amplified by R.K.G. The signal occurring on $t_1$ (resp. $t_2$) is gated by the coincidence gate K1A (recp. K2B) towards the bistate device KA (resp. KB). The output signal on column winding L.M.K. occurs on $t_1$, and is gated by KIC towards KC. Gates KSA, KSB, KSC, are mixers, and offer a free passage to the column output signal.

At the beginning of the CHAST cycle, the bistate devices of the buffer stores are all in the 0-condition, characteristic of a free channel. Upon receiving a signal from the column output amplifier, the bistate device will pass to the 1-condition.

An amplifier output signal corresponds to a memory core that, before being read-out, was in the "1" state, indicating a busy channel. Thus, at the end of $t_2$, bistate devices KA, KB and KC, will be in the 0- or in the 1-condition according to whether channel K is free or busy on highways A, B and C respectively.

Outputs KA0, KB0, KC0 are coupled to the alignment gate KD0. This gate is also under the control of the selection order SO and of timing pulses $t_3$ by the intermediate of coincidence gate PS. The order S.O. has been issued by the register to command a selection cycle of the CHAST. Thus, on time position $t_3$, a signal appears on KD0 if KA, KB, and KC, are all in the 0-condition, corresponding to the information that time slot K is free, i.e. that channel K is free on highways A, B and C.

Figure 4:
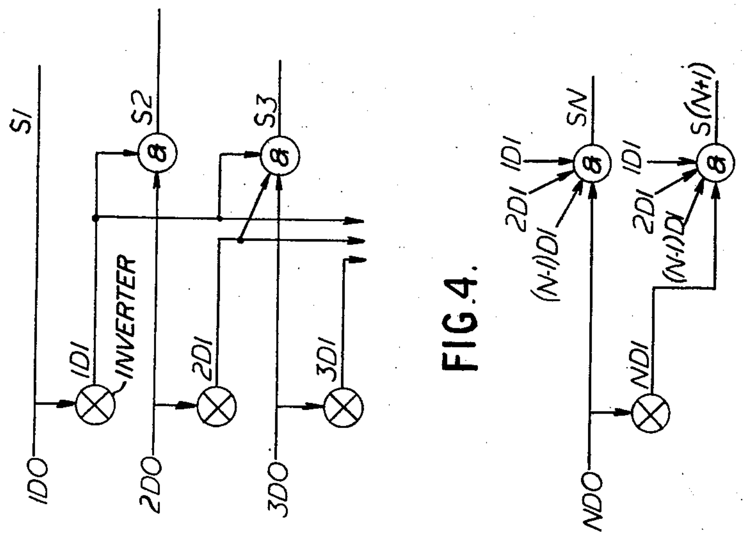
FIG. 4 is a first arrangement of the lock-out circuit.

The output leads such as KD0 of the set of alignment gates D0 are coupled to the lock-out circuit S, of which the elements relative to channel K are represented on FIG. 3, the complete circuit being shown on FIG. 4. The lock-out circuit of FIG. 4 comprises a set of N logical inverters ID1, 2D1, . . ., ND1, that respectively provide signals complementary to those appearing on the outputs of the alignment gates ID0, 2D0, . . ., ND0, and a set of N coincidence gates denoted "selection" gates S2, S3, . . . Sn, $S(N+1)$, the outputs of which constitute the outputs of the lock-out circuit. There is no selection gate corresponding to the lock-out circuit output lead S1, which is directly coupled to the output of ID0. A selection gate SK has as inputs the alignment gate outputs KD0 and the K–1 inverter outputs ID1, . . ., $(K-1)$D1; gate $S(N+1)$ is fed only by the inverter outputs ID1, . . ., ND1. A signal thus appears on output SK in response to a signal on output KD0 only if there are no signals on any of the outputs ID0, . . ., (K−1)D0: that is a free time slot K is selected, only if all lower numbered time slots are busy. Time slot K is then effectively the only one selected since SK is the only lock-out circuit output lead on which a signal appears: none of the higher numbered leads are activated since the corresponding selection gates are blocked due to the absence of the KD1 signal. The selection circuit thus ensures the selection of the lowest numbered free time slot.

The logical inverters ID1, . . . ND1 of FIG. 4 are advantageously replaced, when the lock-out circuit is inserted in the design of FIG. 3, by a set of N mixer gates, identically denoted ID1, . . ., ND1, whose inputs are respectively coupled to the "1" output of the same numbered bistate device of buffer stores A, B and C. The signal on the output of a gate KD1 (FIG. 3) is complementary to that on alignment gate KD0, that is, whenever there is a signal on KD1 there is no signal on KD0 and inversely; thus on FIG. 3 as on FIG. 4 the gates D1 effect the inversion function on the signals appearing on the alignment gates D0.

The lock-out circuit output leads are connected at the inputs of the channel encoder $E_{ch}$, which, in response to a signal on SK makes available to the register the coded identity of the selected channel K. In the event of no time slot being free, a signal appears on output lead $S(N+1)$ of the lock-out circuit, to convey this information directly to the register.

Channel K, having been selected for use in the connection involving highways A, B, and C, must now be recorded in the CHAST memory as engaged on these highways. The output lead SK is coupled, over the mixer gates KSA, KSB, KSC, to the inputs "1" of the bistate devices KA, KB, and KC, respectively. These bistate devices were in the 0-condition since time slot K was free. The appearance of a signal on output SK reverses the condition of the bistate devices.

The buffer store information thus modified on $t_3$ to indicate a busy channel is now reinscribed into the memory stores G.M. and L.M. bistate device output KA1 (resp. KC1) is gated on $t_4$ by K4A (resp. K4C) and is transmitted to the input of the column half-write pulse generator WKG (resp. WKL), on time position $t_4$. The mixer gate KAB offers a free passage to the output KA1. Upon receiving an effective output KA1 (resp. KC1) generator WKG (resp. WKL) sends a half-write pulse, on $t_4$, on the column winding G.M.K. (resp. L.M.K.). Also on $t_4$, the access circuit of G.M. (resp. L.M.) issues a half-write pulse to the memory row corresponding to highway A (resp. C.). By the coincidence of the two half-write pulses on $t_4$ the column K core is thus switched into the "1" state, to indicate a busy channel. The information displayed on all the other bistate devices of the buffer stores A and C, corresponding to the remaining channels, is similarly reinscribed into the memory rows corresponding to highways A and C, on time position $t_4$.

On time position $t_5$ the information displayed on the bistate devices of buffer store B is similarly inscribed into the memory row corresponding to highway B, the KB1 output being transmitted to the half-write pulse generator WKG over gate K5B, and the mixer gate KAB.

At the end of $t_5$, the CHAST memories G.M. and L.M. are thus up to date. On time position $t_6$ the information still displayed on the bistate devices KA, KB, and KC, is cleared by the application of a reset pulse $t_6$, over the mixer gates KFA, KFB, KFC. The bistate devices corresponding to the other channels are similarly reset, so that at the end of the CHAST cycle all buffer store bistate devices are in the 0-condition.

The other types of CHAST operation that may be required by the register will now be briefly considered.

When an established connection is broken, the CHAST must be brought up to date, and register that the channel utilized for that connection is now free on the highways that were used to make up the connection. For a 3-link connection, CHAST operation is identical that outlined above up to time position $t_3$. The register, however, instead of a selection order SO, has issued a liberation order F.O. Thus, with reference to the circuit of FIG. 3, gate PS is blocked, and the channel selection process which it controls on $t_3$ is inoperative. The presence of the liberation order F.O. unblocks gate PF on time position $t_3$. Gate PF controls the channel decoder $D_{ch}$ which has received from the register the coded identity of the channel to be liberated. If this channel is channel K, a signal will appear on decoder output FK, and will be transmitted on $t_3$ over the mixer gates KFA, KFB, KFC, to the 0 inputs of bistate devices KA, KB, KC. Since these correspond to a channel recorded in the CHAST memory as engaged they are in the 1-condition and on the occurrence of a signal on FK will pass to the 0-condition. The CHAST cycle is terminated as above. The bi-states KA, KB, KC, being in the 0-condition, gates K4A, K5B, K4C, remain blocked; no half-write pulse is issued from WKG, WKL; and the column K cores, respective to highways A, B, and C, remain in the "0" remanent state characteristic of a free channel.

For connections involving only two highways, it has been seen that the two highways have their state of channel occupation recorded respectively in memory stores G.M. and L.M. Their coded identities are presented by the register at the input of the access selectors and as above, the channel occupation information is transferred on $t_1$ to buffer stores A and C. At $t_2$, however, the access selector for memory store G.M. is inoperative, since the register has not presented a second group highway coded identity. G.M. is not interrogated on $t_2$ and no information is inscribed on buffer store B; the bistate devices 1B, . . ., NB, remain in their initial condition, which, as has been seen, corresponds to the free channel indication. The selection or liberation of a channel on the two highways involved in the connection can thus proceed normally, since the information displayed on buffer store B corresponds to the adjunction of a fictitious third highway having all its channels free. If channel K is selected for the two-link connection, bistate device KB will be set to the engaged condition: this spurious information is ineffective, since on time position $t_5$, when, for a 3-link connection, the information displayed on buffer store B is transferred to a memory row of G.M., there is no G.M. access selector output to render the half-write pulse issued by the row generator effective.

As has been seen in the course of the description of the network of FIG. 2, the two-link connections are intragroup connections and utilize two distinct times channels. CHAST operation selects or liberates a single time channel. Thus an intra-group connection will require two successive CHAST operation cycles, for the CHAST logic described above.

If a channel is to be selected on a single highway A only, CHAST operation is quite similar to that outlined for a two-link connection. The two buffer stores C and B will remain in their initial condition at $t_3$, the information thus displayed corresponding to the adjunction of two fictitious highways having all their channels free. As has been seen, this will in no way disturb the processing of the channel occupation information relative to highway A.

A considerable number of variations may be made on the detailed logical design of the CHAST as represented on FIG. 3.

For the mode of operation described above, at the beginning of a CHAST cycle the buffer store bistate devices, such as KA, KB, KC, (FIG. 3) are in the condition corresponding to the free channel indication. In the event of any failure of the memory or of its control circuits, the bistate devices KA, KB, KC, will remain in the free condition, even though the corresponding channels are busy. Thus time slot K may be selected for a connection while on one or more of the highways making up the connection channel K is already in use for another connection. A far less critical situation arises if the buffer store bistate devices are in the busy condition at the beginning of the cycle: a failure affecting the transfer of information from the memory stores will result merely in the indication of a time slot as busy even though it is in reality free. This type of operation involves a slightly more complex design than that of FIG. 3, but the modifications to be made remain of a purely elementary nature and will not be discussed in detail.

Instead of effecting the selection of two distinct time slots (as for intra-group connections) in two CHAST cycles, as described above, it may, for certain traffic conditions, be advantageous to lengthen the CHAST cycle so as to allow for a double selection: the actual selection process which occurs on $t_3$, in the description above, may be repeated on $t_4$ or $t_5$, all other operations being correspondingly retarded by one or two time-positions.

Figure 5:
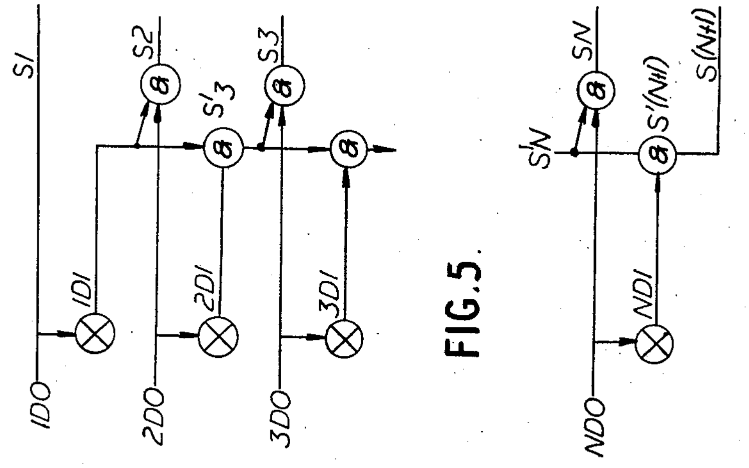
FIG. 5 is a second arrangement of the lock-out circuit.

The lock-out circuit (FIG. 4) itself has an interesting variant in the arrangement of FIG. 5. This alternative realization is much more symmetrical, all coincidence gates have but two inputs, but the number of these gates is doubled, and time delays within the circuit are increased. The output leads of the alignment gates ID0, . . . , ND0 (FIG. 1) are coupled as in the arrangement of FIG. 4: ID0, directly to the lock-out circuit output lead S1, and to the inverter ID1; while 2D0, . . . , ND0, are coupled respectively to the same numbered selection gates S2, . . . , SN, and to the inverters 2D1, . . . , ND1. The arrangement of FIG. 5 comprises a second set of coincidence gates, denoted auxiliary gates: the N-1 auxiliary gates are numbered S'3, E'4, . . . SN, $S'(N+1)$. Except for S'3, an auxiliary gate S'K has as inputs the output of $S'(K-1)$ and of the inverter $(K-1)D1$; for S'3, the inputs are coupled to the outputs of ID1 and 2D1. With the exception of S2, whose second input is coupled to the output of ID1, a selection gate SK has its second input coupled to the output of the same-numbered auxiliary gate S'K. A signal thus appears on a selection gate output SK in response to a (signal on output KD0 only if a signal is also present on output S'K, that is, only if all outputs ID1, . . . $(K-1)D1$ are activated. In this event, the absence of a signal on KD1 blocks all higher numbered auxiliary gates and consequently all higher numbered selection gates. The lowest numbered free time slot K is thus selected. In the event of no time slot being free, a signal appears on auxiliary gate $S'(N+1)$, whose output is coupled to the selection circuit output lead $S(N+1)$. The lock-out circuit of FIG. 5 is thus functionally identical to that of FIG. 4: when inserted into the design of FIG. 3, the inverters will be conveniently replaced, as for the circuit of FIG. 4, by "or" gates whose inputs are complementary to those of the alignment gates ID0, . . . , KD0.

It will be observed that the lock-out circuits of FIGS. 4 and 5 correspond respectively to the logical Equations 1 and 2:

$$SK=K.\overline{K-1}.\overline{K-2}. \ldots \overline{3}.\overline{2}.\overline{1} \quad (1)$$

$$SK=K.(\overline{K-1}.(\overline{K-2}.( \ldots (\overline{3}.\overline{2}.\overline{1})) \ldots ))) \quad (2)$$

in which a term J is written for JD0, with $\overline{JD0}=JD1$. Equation 2 corresponds to a particular association of the terms of Equation 1. To all other associations correspond as many alternative designs of the lock-out circuit, intermediate between those of FIG. 4 and of FIG. 5. For instance, Equation 3 below $$SK=K.(\overline{K-1}.\overline{K-2}.\overline{K-3}.( \ldots (\overline{6}.\overline{5}.\overline{4}.(\overline{3}.\overline{2}.\overline{1})) \ldots )) \quad (3)$$

corresponds, for $K=3n+1$, to the grouping of the lock-out circuit inputs and outputs in groups of three, with one auxiliary gate S' (such as on FIG. 5) per group. In yet another arrangement, of the lock-out circuit, the division in groups may be used to realize a selection in stages: for a two stage circuit, the lowest numbered group comprising a free time slot is selected and the corresponding signal authorizes the selection of the lowest numbered free time slot in that group.

In all the above designs the lock-out circuit selects one output out of N, the identity of which is then encoded in a separate encoding circuit for transfer to the register. In an alternative type of realization, the lock-out circuit may be designed so as to provide directly a coded output. The code utilized depends entirely on the register arrangement which may eventually be such as not to require any coding at all.

The selection of the time slots in a preferential order, as realized by the selection circuits described above, generally conduces to the optimum utilisation of the exchange interconnection network. In certain cases it may however appear desirable to provide for a random selection. It will be appreciated that the choice between preferential and random selection affects only the design of the selection circuit without touching on the general principles of the CHAST.

While the principles of the invention have been described in connection with specific apparatus, it is to be clearly understood that this description is made only by way of example and not as a limitation on the scope of the invention.

I claim:

1. An electronic switching system comprising a plurality of time division multiplex highways, each of said highways having N number of aligned channels individually identified by N number time slots; a channel selection system comprising memory means, buffer storage means, and lockout means; said memory means comprising at least one rectangular matrix having rows and columns of memory cells, each of said rows corresponding to an associated one of said highways and each of said columns corresponding to an associated one of aligned channels on said highways; said buffer storage means comprising a plurality of coincidence gates connected to said memory cells for giving an indication when all aligned channels are idle, there being a coincidence gate for each of said channels; said lockout means comprising means responsive to said buffer storage means for selecting, busying, and freeing time slots when connections are initiated or released; and means for storing a busy signal in the memory cells connected to said one coincidence gate when a channel becomes busy.

2. The electronic switching system of claim 1 and means responsive to the channel becoming idle for cancelling said busy signal stored in the memory cells.

3. The electronic switching system of claim 2 and register means, means for giving said register means access to said memory means, selection order means in said register for commanding said storage of said busy signal, and liberation order means in said register for commanding the cancellation of said busy signal.

4. The electronic switching system of claim 3 said highways corresponding to functional categories, and means associated with said rows for storing information corresponding to said categories.

5. The electronic switching system of claim 3 wherein said buffer storage means comprises N number bistable devices, means controlled by said register means for reading out channel busy or idle information from the rows of said memory means associated with the number of said highways required to complete a connection, said read out being during a predetermined time slot associated with the number of said required highways, means for reading each of said rows that is associated with a corresponding highway during a different time position, and means in said buffer store for storing said read out information.

6. The electronic switching system of claim 5 and a plurality of alignment gates, each of the N number bistable devices of all buffer stores being coupled to an input of a corresponding numbered one of said alignment gates, and means for providing an output at said alignment gate to indicate that said required number of highways are idle if the required number of said bistable devices corresponding to said required number of highways indicate idle conditions.

7. The electronic switching system of claim 6 and means whereby the same number of said bistable devices of all of said buffer stores are connected to said memory means, and means for transferring in parallel busy and idle information from said memory means to said buffer store in at least one of time position.

8. The electronic switching device of claim 7 wherein said transfer is in a plurality of said time positions.

9. The electronic switching system of claim 6 wherein one state of said bistable devices indicates idle conditions and the other state represents busy conditions.

References Cited by the Examiner

UNITED STATES PATENTS

| | | | |
|---|---|---|---|
| 2,841,651 | 7/58 | Trousdale | 179—15 |
| 2,868,881 | 1/59 | Trousdale | 179—15 |
| 2,910,541 | 10/59 | Harris | 179—15 |
| 2,910,542 | 10/59 | Harris | 179—15 |
| 2,917,583 | 12/59 | Burton et al. | 179—15 |
| 3,029,311 | 4/62 | Ward | 179—15 |
| 3,046,348 | 7/62 | Osborn | 179—15 |

DAVID G. REDINBAUGH, *Primary Examiner.*

ROBERT H. ROSE, *Examiner.*